US007772546B2

(12) United States Patent
Jackson

(10) Patent No.: US 7,772,546 B2
(45) Date of Patent: Aug. 10, 2010

(54) PORTABLE LOEB-EIBER MASS SPECTROMETER

(75) Inventor: Glen P. Jackson, Athens, OH (US)

(73) Assignee: Ohio University, Athens, OH (US)

(*) Notice: Subject to any disclaimer, the term of this patent is extended or adjusted under 35 U.S.C. 154(b) by 170 days.

(21) Appl. No.: 12/235,647

(22) Filed: Sep. 23, 2008

(65) Prior Publication Data

US 2010/0072358 A1 Mar. 25, 2010

(51) Int. Cl.
*H01J 49/26* (2006.01)
*H01J 49/10* (2006.01)
*B01D 59/44* (2006.01)

(52) U.S. Cl. .................. 250/281; 250/282; 250/396 R; 250/397; 315/111.81

(58) Field of Classification Search ................ 250/281, 250/382, 396 R, 397, 423 R; 315/111.81
See application file for complete search history.

(56) References Cited

U.S. PATENT DOCUMENTS 6,124,592 A * 9/2000 Spangler ..................... 250/287
6,683,301 B2 * 1/2004 Whitehouse et al. ........ 250/288

OTHER PUBLICATIONS

European Patent Office, Search Report and Written Opinion, from corresponding PCT/US2009/057779, dated Jan. 7, 2010.

Haberland et al., Converting a Reflectron Time-of-Flight Mass Spectrometer into a Tandem Instrument, Review of Scientific Instruments, AIP, Melville, NY, US, vol. 62, No. 10, Oct. 1, 1991.

VH Eiber, Bestimmung von lonenmassen bei Gasdrücken bis zu einigen Torr mittels eins hochfrequenzgespeisten Siebgitters, Zeitschrift für Angewandte Physik. 15 (1963) 461.

NE Bradbury, Electron Attachment and Negative Ion Formation in Oxygen and Oxygen Mixtures, Phys. Rev. 44 (1933) 883.

OK Yoon, IA Zuleta, MD Robbins, GK Barbula, RN Zare, Simple Template-Based Method to Produce Bradbury-Nielson Gates, J. Am. Soc. Mass Spectrom. 18 (2007) 1901.

IG Zuleta, GK Barbula, MD Robbins, OK Yoon, RN Zare, Micromachined Bradbury-Nielson Gates, Anal. Chem. 79 (2007) 9160.

L Sleno, D Volmer, Ion Activation Methods for Tandem Mass Spectroscopy. J. Mass Spectrom. 39 (2004) 1091.

Committee on Assessment of Security Technologies for Transportation, "Opportunities to Improve Airport Passenger Screening with Mass Spectrometry," National Research Council, Washington (2004).

C. Crume, The Business of Making a Lab Field-Portable, Environ. Testing Anal., Nov./Dec. (2000).

(Continued)

*Primary Examiner*—Nikita Wells
(74) *Attorney, Agent, or Firm*—Wood, Herron & Evans, LLP

(57) ABSTRACT

A portable mass spectrometer including an ion source, an ion detector, and a Loeb-Eiber style high-pass ion separator comprising an array of wires. The array can have first and second sets of wires where the distance between adjacent wires is less than the diameter of each of the wires. An electrical generator can be configured to create an electrical current and supply the electrical current to the first set of wires while the second set of wires remains grounded.

23 Claims, 7 Drawing Sheets

OTHER PUBLICATIONS

O.D. Sparkman et al., Focus on Field-Portable and Miniature Mass Spectrometers, Presentations from the 12th Sanibel Conference on Mass Spectrometry, J. Am. Soc. Mass Spectrom. 12 (2001) 617-618.
J. Workman, Jr. et al., Process Analytical Chemistry, Anal. Chem. 71 (12) (1999) 121R-180R.
T. Kotiaho, On-Site Environmental and in Situ Process Analysis by Mass Spectrometry, J. Mass. Spectrom. 31 (1996) 1-15.
G.A. Eiceman, Ion-Mobility Spectrometry as a Fast Monitor of Chemical Composition, Trends Anal. Chem. 21 (4) (2002) 259-275.
T. Keller et al., Ion Mobility Spectrometry for the Detection of Drugs in Cases of Forensic and Criminalistic Relevance, Int. J. Ion Mobility Spectrom. 2 (1) (1999) 23-34.
P.A. Smith et al., Detection of Gas-Phase Chemical Warfare Agents Using Field-Portable Gas Chromatography-Mass Spectrometry Systems: Instrument and Sampling Strategy Considerations, Trends Anal. Chem. 23 (4) (2004) 296-306.
K.M. Sloan et al., Development and Evaluation of a Low Thermal Mass Gas Chromatograph for Rapid Forensic GC-MS Analyses, Field Anal. Chem. Technol. 5 (6) (2001) 288-301.
B.A. Eckenrode, Environmental and Forensic Applications of Field-Portable GC-MS: An Overview, J. Am. Soc. Mass Spectrom. 12 (2001) 683-693.
C.M. Henry, The Incredible Shrinking Mass Spectrometers, Anal. Chem. 71 (7) (1999) 264A-268A.
E.R. Badman et al., Miniature Mass Analyzers, J. Mass Spectrom. 35 (2000) 659-671.
L.B. Loeb, The Energy of Formation of Negative Ions in O2, Phys. Rev. 48 (1935) 684-689.
C. Cunningham et al., High Amplitude Short Time Excitation: A Method to Form and Detect Low Mass Product Ions in a Quadrupole Ion Trap Mass Spectrometer, J. Am. Soc. Mass Spectrom. 17 (1) (2006) 81-84.
G.P. Jackson et al., A New Pulsed Glow Discharge Source with Enhanced Ion Extraction for Small Non-Conductive Samples and Atmospheric Sampling, J. Anal. At. Spectrom. 18 (6) (2003) 665-669.
Z. Takats et al., Mass Spectrometry Sampling Under Ambient Conditions with Desorption Electrospray Ionization, Science 306 (2004) 471-473.
R.B. Cody et al., Versatile New Ion Source for the Analysis of Materials in Open Air Under Ambient Conditions, Anal. Chem. 77 (8) (2004) 2297-2302.
J.P. Guzowski et al., Characterization of Switched Direct Current Gas Sampling Glow Discharge Ionization Source for the Time-of-Flight Mass Spectrometer, J. Anal. At. Spectrom. 15 (2000) 27-36.
J.P. Guzowski et al., Gas Sampling Glow Discharge: A Versatile Ionization Source for Gas Chromatography Time-of-Flight Mass Spectrometry, Anal. Chem. 72 (2000) 3812-3820.
V. Majidi et al., Explicit Chemical Speciation by Microsecond Pulsed Glow Discharge Time-of-Flight Mass Spectrometry: Concurrent Acquisition of Structural, Molecular and Elemental Information, J. Anal. At. Spectrom. 15 (2000) 19-25.
L. Gao et al., Mini 11 Handheld Mass Spectrometer with Glow Discharge Ion Source and Atmospheric Pressure Interface, 55th ASMS Conference on Mass Spectrometry, Indianapolis, IN, 2007.
G.P. Jackson et al., Spectral, Spatial and Temporal Characteristics of a Millisecond Pulsed Glow Discharge: Metastable Argon Atom Production, Spectrochim. Acta, Part B 56 (12) (2001) 2449-2464.
L. Ding et al., Ion Motion in the Rectangular Wave Quadrupole Field and Digital Operation Mode of a Quadrupole Ion Trap Mass Spectrometer, Rapid Commun Mass Spectrom 20 (1) (2006) 3-8.
L. Ding et al., A Digital Ion Trap Mass Spectrometer Coupled with Atmospheric Pressure Ion Sources, J. Mass Spectrom. 39 (5) (204) 471-484.
L. Ding et al., A Simulation Study of the Digital Ion Trap Mass Spectrometer, Int. J. Mass Spectrom. 221 (2) (2002) 117-138.
M.A. Dearth et al., Nitric Oxide Chemical Ionization Ion Trap Mass Spectrometry for the Determination of Automotive Exhuast Consituents, Anal. Chem. 69 (24) (1997) 5121-5129.
S.A. McLuckey et al., Atmospheric Sampling Glow Discharge Ionization Source for the Determination of Trace Organic Compounds in Air, Anal. Chem. 60 (1988) 2220-2227.
D.R. Ifa et al., Forensic Analysis of Inks by Imaging Desorption Electrospray Ionization (DESI) Mass Spectrometry, Analyst 132 (5) (2007) 461-467.
S.E. Rodriguez-Cruz, Rapid Analysis of Controlled Substances Using Desorption Electrospray Ionization Mass Spectrometry, Rapid Commun. Mass Spectrom. 20 (1) (2006) 53-60.
L.A. Leuthold et al., Desorption Electrospray Ionization Mass Spectrometry: Direct Toxicological Screening and Analysis of Illicit Ecstasy Tablets, Rapid Commun. Mass Spectrom. 20 (2) (2006) 103-110.
J.P. Williams et al., The Use of Recently Described Ionisation Techniques for the Rapid Analysis of Some Common Drugs and Samples of Biological Origin, R. Commun. Mass Spectrom. 20 (9) (2006) 1447-1456.
Z. Takats et al., Ambient Mass Spectrometry Using Desorption Electrospray Ionization (DESI): Instrumentation, Mechanisms and Applications in Forensics, Chemistry, and Biology, J. Mass Spectrom. 40 (10) (2005) 1261-1275.
N. Talaty et al., Rapid in Situ Detection of Alkaloids in Plant Tissue Under Ambient Conditions Using Desorption Electrospray Ionization, Analyst 130 (12) (2005) 1624-1633.
P.A. D'Agostino et al., Desorption Electrospray Ionisation Mass Spectrometric Analysis of Chemical Warfare Agents from Solid-Phase Microextraction Fibers, Rapid Commun. Mass Spectrom. 21 (4) (2007) 543-549.
I.A. Popov et al., Detection of Explosives on Solid Surfaces by Thermal Desorption and Ambient Ion/Molecule Reactions, Chem. Comm. (15) (2005) 1953-1955.
Z. Takats et al., Direct, Trace Level Detection of Explosives on Ambient Surfaces by Desorption Electrospray Ionization Mass Spectrometry, Chem. Comm. (15) (2005) 1950-1952.
I. Cotte-Rodriguez et al., Rapid Trace Detection of Triacetone Triperoxide (TATP) by Complexation Reactions During Desorption Electrospray Ionization, Chem. Comm. (9) (2006) 953-955.
C.C. Mulligan et al., Desorption Electrospray Ionization with a Portable Mass Spectrometer: In Situ Analysis of Ambient Surfaces, Chem. Comm. (16) (2006) 1709-1711.
A. Venter et al., A Desorption Electrospray Ionization Mass Spectrometry Study of Aging Products of Diphenylamine Stabilizer in Double-Base Propellants, Prop., Explos., Pyrotech. 31 (6) (2006) 472-476.
J.R. Almirall et al., Trends in Forensic Science Education: Expansion and Increased Accountability, Anal. Bioanal. Chem. 376 (2003) 1156-1159.
A. Boyle, In Crime, Sleuths Cope with "CSI" Effect, http://www.msnbc.msn.com/id/7003715, Accessed Feb. 2007.
M.J. Saks et al., The Coming Paradigm Shift in Forensic Identification Science, Science 309 (2005) 892-895.
U.A. Laskay, Dynamic Collision-Induced Dissociation (Dcid) in a Quadrupole Ion Trap Using a Two-Frequency Excitation Waveform: I. Effects of Excitation Amplitude and Phase Angle, J. Am. Soc. Mass Spectrom. 18 (4) (2006) 749-761.
O.L. Collin et al., Dynamic Collision-Induced Dissociation of Peptides in a Quadrupole Ion Trap Mass Spectrometer, Anal. Chem. (2007) ASAP article published online Jun. 17, 2007.
D.E. Goeringer et al., Ion Internal Temperature and Ion Trap Collisional Activation: Protonated Leucine Enkaphalin, Int. J. Mass Spectrom. 182/183 (1999) 275-288.
J. Murrell et al., "Fast Excitation" CID in a Quadrupole Ion Trap Mass Spectrometer, J. Am. Soc. Mass Spectrom. 14 (7) (2003) 785-789.
H. Eiber, Idenfifizierung Von Ionen in Verdunnten Gasen Mit Hilfe Eines Neuartigen Hochfrequenz Massensiebes, Compt. Rend. Conf. Intern. Phenomenes D'ionization Gaz, Paris, 1963, p. 306-308.
G. Jackson, Principal Investigator, Award Abstract #0745590 for CAREER: Mass Spectrometry for the Masses, National Science Foundation, Jan. 9, 2008.

* cited by examiner

PORTABLE LOEB-EIBER MASS SPECTROMETER

FIELD OF THE INVENTION

The invention relates to instrumentation used in chemical analysis, specifically to mass spectrometers.

BACKGROUND OF THE INVENTION

Chemical analysis methods provide the user with an ability to determine the chemical make-up of a substance and thereby identify that substance. These methods have been used throughout various disciplines including forensics and security investigations. Today security requires a constant vigil and there is an increasing need for readily available, analytical procedures for evaluating the chemical make-up of potentially harmful or destructive materials. This need is more pronounced at airports and border crossings where a large number of parcels are examined over a large area in a relatively short period of time. One especially robust means of performing chemical analysis is mass spectrometry.

Mass spectroscopy is an analytical procedure for the separation and quantification of ions based upon the mass-to-charge ratio of the ions within a chemical sample. Traditionally, these instruments have been relatively large and non-mobile due to the operational requirements of the instrument, namely the large vacuum pumps to provide low pressures for ion currents, as well as high-voltage power generators, amplifiers, and matching circuits.

The chemical analysis procedures presently used in airport and border security include canines and ion mobility spectrometry (IMS). However, the ion resolution of IMS is far inferior to the commercially available mass spectroscopy unit. Thus, there is a need to implement the benefits of a mass spectrometer into the size of an IMS to further enable field research and environmental monitoring, including but not limited to, homeland security and defense applications.

A portable mass spectrometer would ideally be self-contained, operate at near atmospheric pressures with low electrical current demand, have a robust and flexible ion source, provide high resolution spectra with low signal-to-noise ratios, provide data interpretation, and be low cost.

SUMMARY OF THE INVENTION

The present invention relates to a portable mass spectrometer and the methods of using the same. The portable mass spectrometer includes an ion source, an ion detector, and a Loeb-Eiber style high-pass ion separator comprising an array of wires.

The objects and advantages of the present invention will be further appreciated in light of the following detailed description and drawings provided herein:

BRIEF DESCRIPTION OF THE DRAWINGS

The accompanying drawings, which are incorporated in and constitute a part of this specification, illustrate embodiments of the invention and, together with a general description of the invention given above and the detailed description given below, serve to explain the principles of the invention.

DETAILED DESCRIPTION

Figure 1:
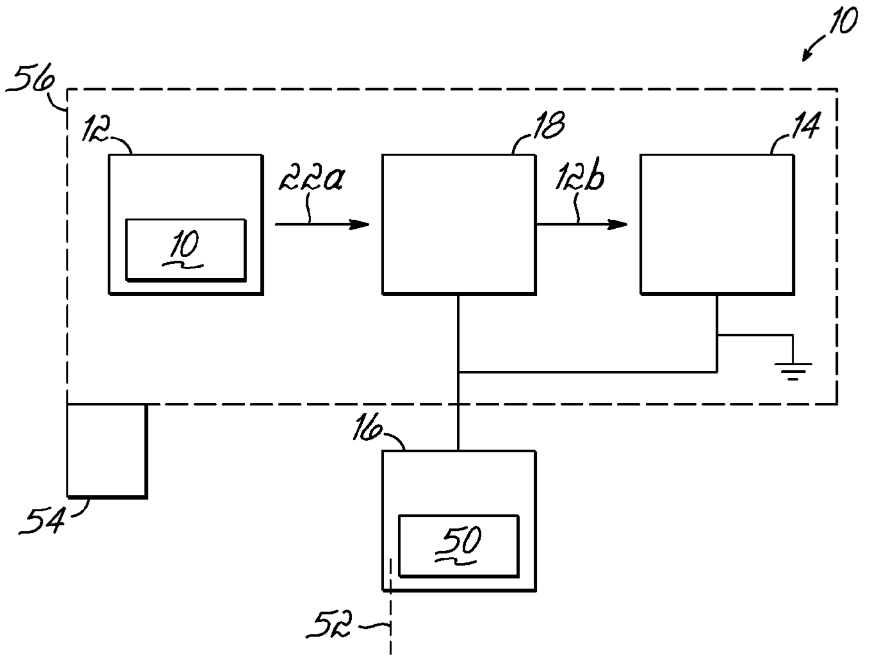
FIG. 1 is a diagrammatic view of a black box mass spectrometer.

A mass spectrometer 10 of the present invention, illustrated at FIG. 1, includes an ion source 12, an ion detector 14, a controller 16, and an ion separator 18 located between the ion source 12 and the ion detector 14. The ion source 12 is the input location for a prepared chemical sample and includes an ionization chamber 20. The chemical sample containing at least one neutral chemical species (such as a single atom of any element or a small molecule) is injected into the ion source 12, which then enters the ionization chamber 20 to be ionized. After entering the ionization chamber 20, the neutral chemical species will be ionized by any one of several known methods. In one embodiment, the ionization can be accomplished by bombarding the chemical sample with a beam of high-energy electrons. Upon impact between the neutral chemical species and a high-energy electron of sufficient energy, the neutral chemical species will lose an electron and form a positive ion. This ion is characterized by its mass-to-charge ratio, m/z, where m is the atomic or molecular mass of the ion and z is the charge number of the ion (i.e., the total charge divided by elementary charge, e). The distance traveled by the chemical species between impacts with electrons is generally known as the mean free path, λ.

One suitable ion source 12 according to this method of ionization is an EI ion source 12, such as those manufactured by Kimball Physics of Wilton, N.H.; otherwise one skilled in the art could manufacture a suitable ion source for the particular needs.

In some embodiments, the ion source 12 could be coupled with an electrode to create a corona discharge, which ensures complete ionization of all chemical species, particularly solvents at atmospheric pressures.

In yet other embodiments, the ion source 12 can include atmospheric pressure photoionization (APPI; not shown) or atmospheric pressure chemical ionization (APCI; not shown) sources. These sources can reduce the effects of water contamination in select situations. Ion sources 12 such as Desorption Electrospray Ionization (DESI; manufactured by Prosolia Inc. of Indianapolis, Ind.) and Direct Analysis in Real Time (DART; manufactured by JEOL of Peabody, Mass.), may be particularly useful in the analysis of chemicals found in drugs, chemical warfare agents, and explosives.

The newly formed positive ions are extracted from the ionization chamber 20 as an ion current 22*a* in a direction substantially toward the ion separator 18. The extraction may occur by a positively charged repeller plate 24 or a negatively charged extraction grid 26 (see FIG. 2). The negatively charged extraction grid 26 and the repeller plate 24 may also be used in combination so as to accelerate the ion current 22*a* in a direction substantially toward the ion separator 18. The negatively charged extraction grid 26 can also provide the added benefit of focusing or controlling the kinetic energy of the ion current 22*a* emanating from the ion source 12. Alternatively, focusing lenses (not shown) can be used for a similar purpose.

Figure 3A:
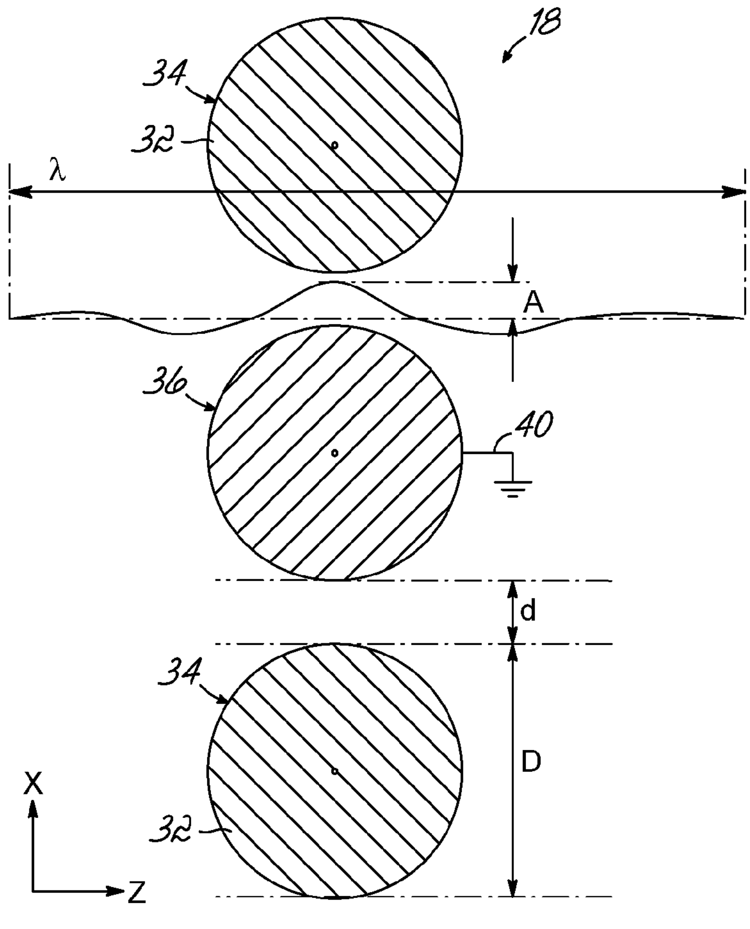
FIG. 3A is a schematic cross-sectional view of an array of wires having diameters D, separated by distance, d, in relation to the mean free path, λ.
Figure 3B:
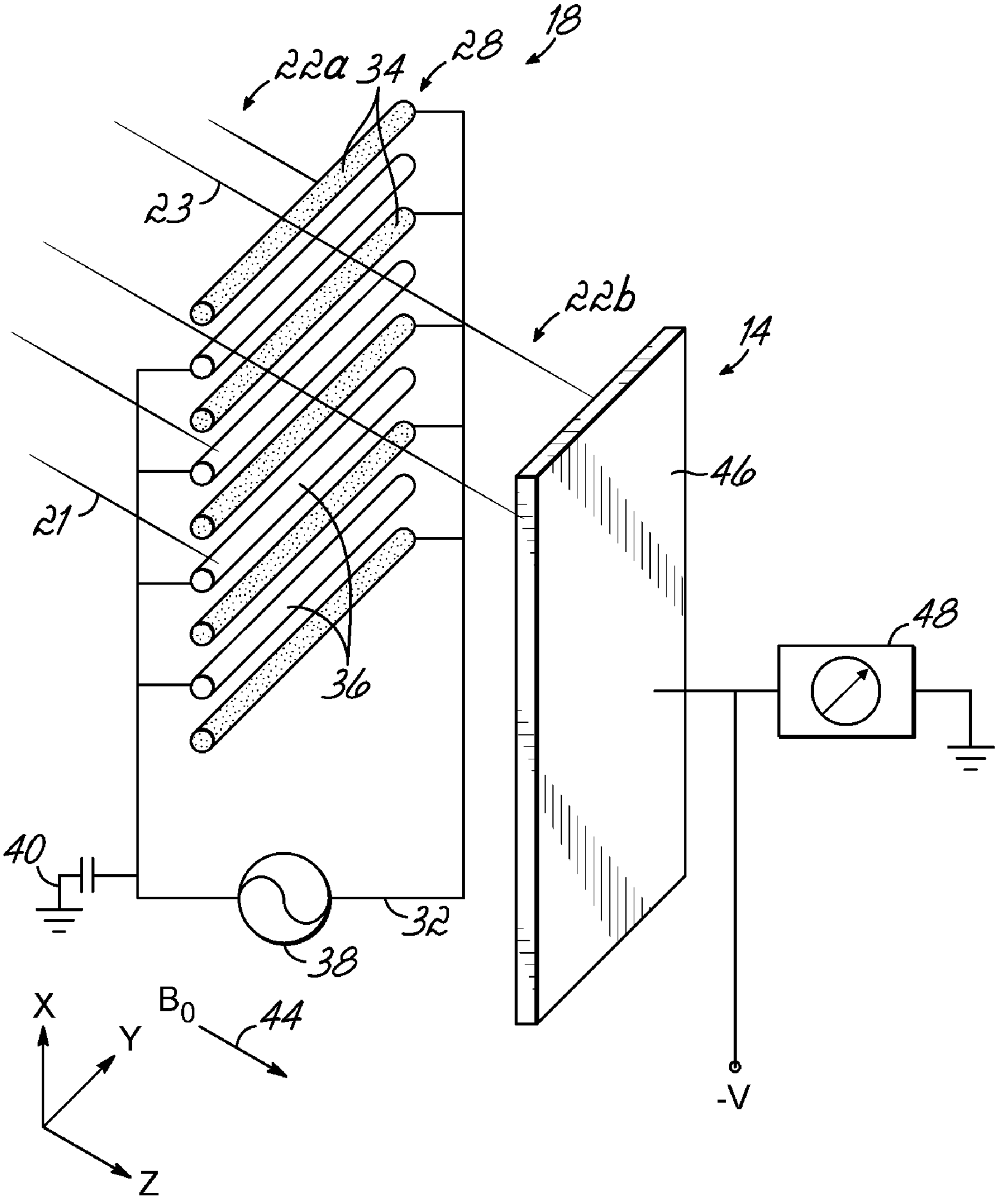
FIG. 3B is a schematic perspective view of an array of wires in relation to the ion current and the field, $B_0$.

The mass spectrometer 10 according to the present invention includes a Loeb-Eiber filter as the ion separator 18, which is diagrammatically shown in FIGS. 3A and 3B. The ion separator 18 includes an array of wires 28 (three wires are shown in FIG. 3A) including first 34 and second 36 wire sets where the distance between adjacent wires, i.e. an inter-wire distance, d, is less than the diameter, D, of each of the wires. An electrical current generator 38 supplies an electrical current to the first set of wires 34 while the second set of wires 36 remains grounded. As illustrated, the first and second sets of wires 34, 36 are interlaced in a one-to-one fashion such that a grounded wire 40 separates two current-carrying wires 42. Alternatively, it would be understood that a constant electrical current supply could be applied to the first set of wires 34 while a variable electrical current supply is applied to the second set of wires 36. Further arrangements may be necessary for particular embodiments.

The flow of an electrical current through an array of wires 28 induces an electromagnetic field that oscillates in a direction that is orthogonal to the direction of the array of wires 28. When appropriate amplitudes of electrical current are achieved, the electromagnetic field is within the radiofrequency ("RF") range, which is designated on FIG. 3B as the $B_0$ field arrow 44. Placement of an ion within a $B_0$ field will generally excite the ion. The degree of excitation is dependent on the ion species and the magnitude of $B_0$. It is this degree of excitation of the ion that is utilized by the Loeb-Eiber filter to separate ions according to their mass-to-charge ratios.

The force applied to a charge particle, i.e. the ion, in a fluctuating electromagnetic field operating in the RF range is governed by the Lorentz equation:

$$F=z(E+v\times B) \quad \text{Equation 1}$$

where z is the charge of the ion, E is the electrical field strength, and v×B is the cross product of the ion velocity and the magnetic field strength. It is also known generally that force applied to an object is equal to the product of the object's mass and the acceleration motion of the object. Thus, combining these expressions yields the amplitude of ion motion, A:

$$A=(z/m)[E+v\times B] \quad \text{Equation 2}$$

When the mean free path, λ, of the ion is much greater than the wire diameter, i.e. when λ>>D>d, then A becomes $$A=-(z/m)(E/\omega^2) \quad \text{Equation 3}$$

This equation provides that for a particular ion, the mass-to-charge ratio (m/z) is linearly related to the field strength (E) over the square of the angular frequency (ω) of the RF. Thus, for a given $E/\omega^2$, the ion separator 18 will act as a high-pass filter with a low-mass-cut-off (LMCO) value, which is satisfied when $A \geqq d/2$.

The electrical current generator 38, by generating an electrical current that passes through the first set of wires 34, induces an RF potential with an amplitude, V, onto the array of wires 28. The angular frequency, ω, of the RF waveform on the array of wires 28 can generally be a sine wave (see FIG. 6A). However, in other circumstances, it is anticipated that other waveforms, including digital-square (FIG. 6B) or saw-tooth (FIG. 6C), may provide for better control of the RF potential.

Construction of an ion separator 18 according to this embodiment can include the use of nitinol wires, which allow for a large degree of stretching and manipulation of the wire into the array of wires 28. Other suitable materials include gold (Au), copper (Cu), or any other conductive metal or metal alloy known to be suitable by one skilled in the art. However, the invention should not be considered to be limited to these examples. Regardless of the wire composition, the diameter, D, of the wire should range from approximately 1 μm to approximately 10 cm, wherein approximately 75 μm is the preferred diameter. The inter-wire distance, d, can also vary from less than approximately 1 μm to approximately 10 cm, wherein approximately 25 μm is suitable. The ratio of D-to-d should have the relation:

$$5d<D<2d \quad \text{Equation 5}$$

However, the dimensions of the wires and inter-wire distance should not be considered so limited.

While cross-sectional area of the wires is typically circular, wires having a square- or a rectangular-shape cross-sectional area are also viable geometries for the filter arrays. Computer simulations with SIMION (Scientific Instrument Services, Inc.) indicate that mass filtering can occur at lower RF voltages with the square- or rectangular-shaped wire as compared with circular wire. Thus, the wires can alternatively be fabricated by etching techniques and chip-based technologies instead of wire-based wrapping or threading.

One suitable etching technique can be a Micro-Electrical-Mechanical System (MEMS) formation process. This method of fabrication (not shown) includes the deposition of electrically-conductive materials in a provided pattern onto a silicon substrate. The microscale of the MEMS formation process would enable one skilled in the art to form an ion separator 18 according to the present invention having micro-scale wire diameters, D, and separation distances, d. Optimal fabrication methods and values for D and d would further improve the mass resolution over the presently used IMS detectors.

The ion current 22*a* is filtered in a manner described in detail below and results in ion current 22*b*. Ion current 22*b* is directed to an ion detector 14, which is operable to detect a quantity of ions comprising the ion current 22*b*. The detector 14 can include a Faraday plate 46 coupled to a picoammeter 48, which includes an electrode operable to measure a current, I, induced by a number of ions, n, striking the electrode over a period of time, t, in accordance with equation 6:

$$n/t=I/e \quad \text{Equation 6}$$

Here, as before, e is the elementary charge. Thus, as an ion current 22*b* impacts the Faraday plate 46, the resultant charge measured over a period of time provides a relative number of ions that impact the ion detector 14. Other ion detectors 14 may be used.

Operation of the ion source 12, ion separator 18, and ion detector 14 may occur by a controller 16 (FIG. 1). The controller 16 operates the electrical current generator 38 and its supply of electrical current to the first set of wires 34. The controller 16 may further operate the ion detector 14. A suitable controller 16 can be a standard lap-top PC computer; however, the present invention should not be considered so limited. The controller 16 may include a memory 50 for storing data related to each of the mass spectrometer 10 operations for later chemical analysis. The memory 50 can be internal, such as a hard-drive ROM, or a removable ROM for off-site, off-line chemical analysis. Additionally, the controller 16 can include a data transmission means 52 for sending the stored data to another suitable workstation (not shown). Said data transmission means 52 can be a wireless device or hard-wired, such as an Ethernet connection.

If the controller 16 includes a PCI board (not shown), the workstation can be controlled via the data transmission means 52 from a remote location (not shown).

The controller 16 may include chemical analysis software for the on-site and immediate analysis of the chemical sample. For example, the software Labview (manufactured by National Instruments Corp. of Austin, Tex.) can easily be loaded onto the lap-top and provides immediate spectral analysis.

In some instances, the mass spectrometer 10 can further include a small, bench-top vacuum chamber 54 to reduce the pressure within a chamber 56 enclosing the ion source 12, the ion separator 18, and the ion detector 14 to a pressure that is slightly below atmospheric pressures. For example, a Teledyne ion-trap vacuum chamber utilized with a 60 L/s turbo pump provides adequate vacuum pressures.

The electrical demands of a mass spectrometer 10 apparatus according to the present invention can require voltages as large as 1 kV, requiring a programmable high voltage power supply such as those available from EMCO (Sutter Creek, Calif.), by Matsusada (Behemia, N.Y.), or others wherein the power supply (not shown) operates in a range from about 0 V to about 5 V DC and with a 24 V power supply. The AC power can be approximately 30 V for m/z values up to approximately 600. Small, solid-state circuit boards, similar to those produced by Matsusada (Behemia, N.Y.) or Ardara (North Huntington, Pa.), can provide adequate AC power.

Figure 2:
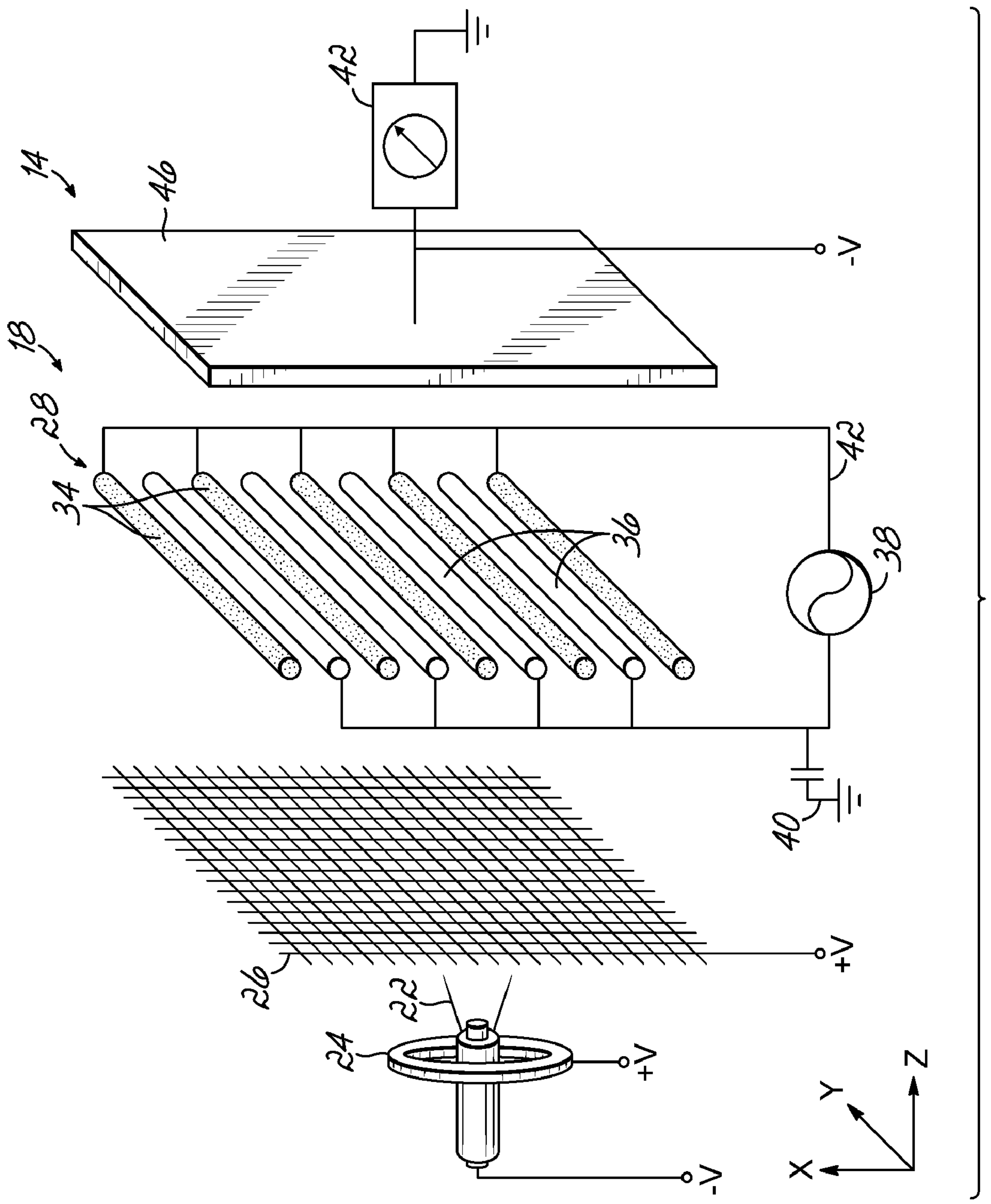
FIG. 2 is a schematic perspective view of a mass spectrometer having a Loeb-Eiber filter according to one embodiment of the present invention.

In operation of the mass spectrometer 10, and as is shown in FIGS. 2 and 3B, an ion current 22*a* extracted from the ion source 2 comprising at least two species of ions having mass-to-charge ratios of m1/z1 and m2/z2 is directed to the ion separator 18. The electrical current generator 38 supplies an electrical current through the first set of wires 34 such that an RF potential is produced over the array of wires 28. The RF potential induces an ion motion, A, that is directly related to the respective m/z values and the RF potential properties. As the RF potential increases, the intensity of the ion current 22*b* will decrease due to an increase in the amplitude of m1/z1 ion motion, A. That is, the amplitude of ion motion for the m1/z1 ion will continue to increase until A is equivalent to, or exceeds, 2d. At this amplitude of ion motion, the first ion current 21 is unable to pass through the ion separator 18, and is filtered from the ion current 22*b*. Only the second ion current 23 is measured by the ion detector 14.

Figure 4A:
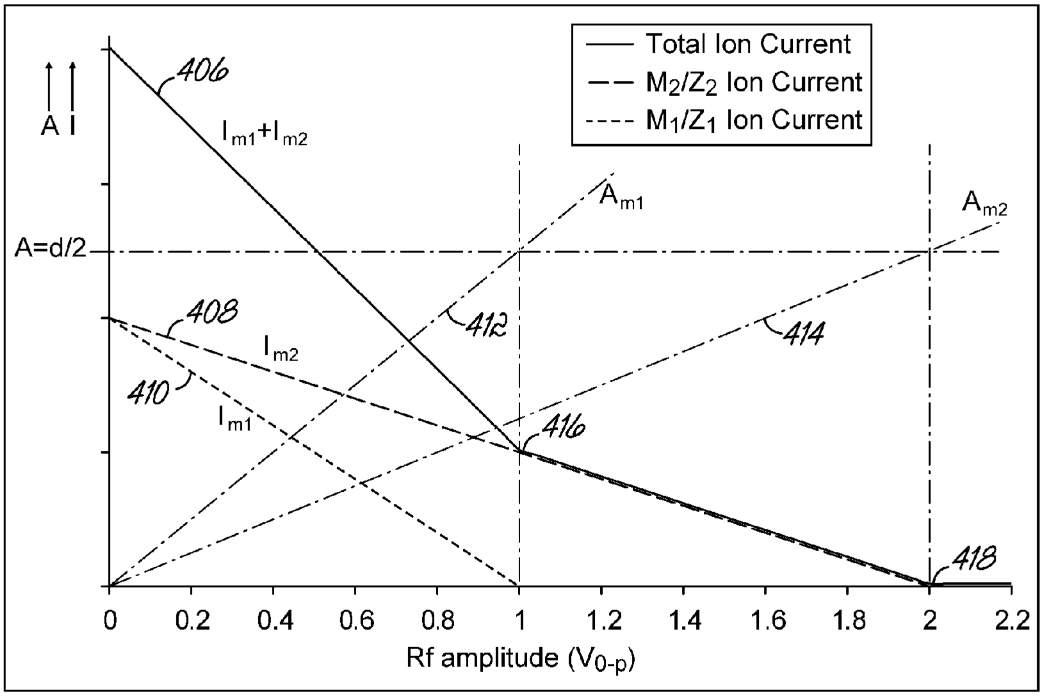
FIG. 4A is a graph of Ion Current, I, versus RF potential, V, for two ions characterized by m1/z1 and m2/z2 and the total ion current at the ion detector due to the two ions.
Figure 4B:
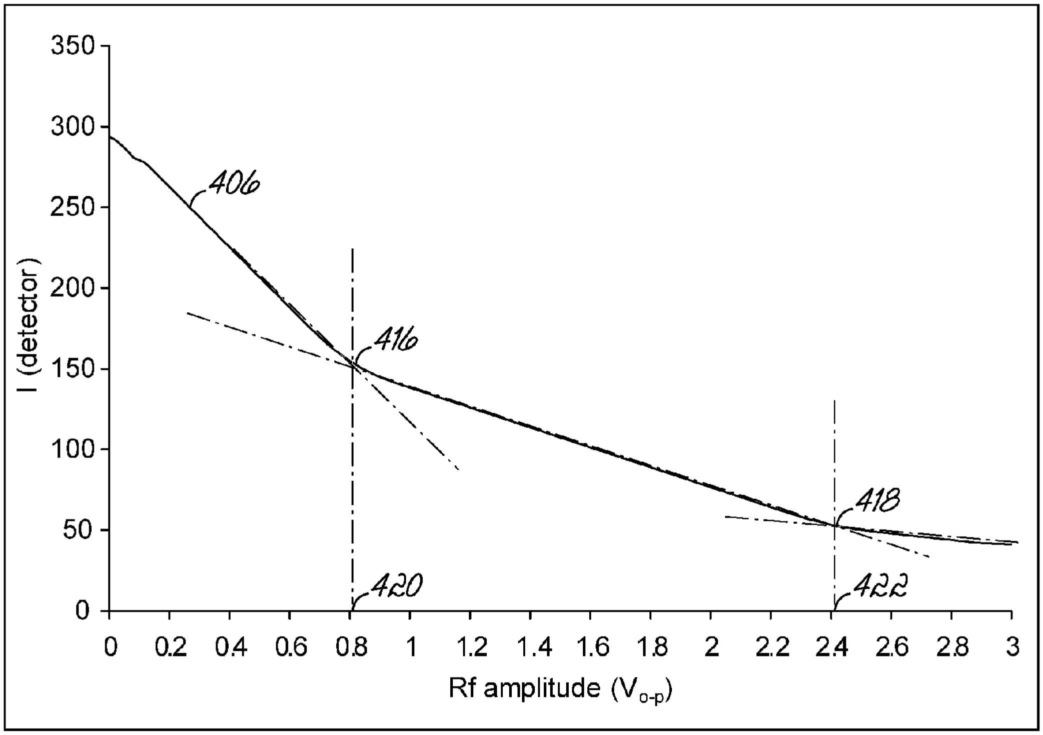
FIG. 4B is a graph of I versus V, showing the total ion current only.

At the ion detector 14, the measured ion current 22*b* decreases linearly with increasing RF potential (see examples of total ion current 406 in FIGS. 4A and 4B). When the RF potential produces an A value for the m1/z1 ion that meets or exceeds 2d, thereby satisfying the LMCO for m1/z1, the ion current 22*b* measured at the ion detector 14 will include only the m2/z2 ion, and an inflection 416 occurs in the total ion current 406 curve. Likewise, a second inflection 418 occurs at a second RF potential when the LMCO for m2/z2 is satisfied for the second ion. For the hypothetical chemical sample shown in FIG. 4A, because only two ion species were present in the chemical sample, the total ion current 406 goes to zero after this second inflection 418; the hypothetical chemical sample shown in FIG. 4B would include a third inflection (not shown) at an RF potential greater than 3 V. One skilled in the art would readily appreciate that the number of inflections 416, 418 observed in the total ion current 406 curve can equal the number of ion species in the chemical sample. It would further be appreciated that the total ion current curve 406 in FIG. 4A is the constructive addition of a first ion current curve 410, i.e. the contribution to the ion current 22*b* resulting from a first ion current 21, and a second ion current curve 408, i.e. the contribution to the ion current 22*b* resulting from a second ion current 23.

As provided above, the ratio of RF potentials 420, 422 corresponding to the respective two inflections 416, 418 are directly related to the ratios of m1/z1 and m2/z2 of the first and second ions within the chemical sample. Thus, the ion species in the hypothetical chemical sample shown in FIG. 4A have an m/z ratio of 1:2, while the ion species in the chemical sample of FIG. 4B have an m/z ratio of 1:3.

To calibrate the mass spectrometer 10, a calibration chemical sample having at least first and second ions with known m1/z1 and m2/z2 values, respectively, is prepared. The known calibration chemical sample is injected into the ion source 12 and the chemical species are ionized within the ionization chamber 20. The ion current 22*a* is extracted and directed toward the ion separator 18 according to one of the embodiments described. An electrical current is directed through the array of wires 28 thereby generating an RF potential. As the RF potential is varied, the ion current 22*b* decreases linearly in a manner similar to that described above in reference to FIGS. 4A and 4B. At the RF potential 420 that satisfies the LMCO of m1/z1, the change in ion current 22*b* measured at the ion detector 14 undergoes an inflection 416 such that the ion current 22*b* is comprised entirely of the second ion current 42. When the RF potential 422 is then varied such that LMCO is then satisfied for the second ion, a second inflection 418 occurs.

Because the m/z values for the ion species of the calibration chemical sample will have a known ratio, the RF potentials 420, 422 corresponding to inflections 416, 418 are easily correlated to the proper m/z value. A calibration spectrum can then be generated from the known m1/z1 and m2/z2 values with the RF potentials 420, 422 corresponding to the respective inflections 416, 418. In this way, unknown ion m/z values may later be extrapolated by correlating the detected RF potentials of the unknown sample to the known calibration as described in detail below.

Any calibration chemical sample known within the art would be appropriate for use in the present invention, and should not be limited to those having only two ion species as illustrated. For example, perfluorotributylamine (PFTBA), or other readily available and known calibration samples can be used.

Figure 4C:
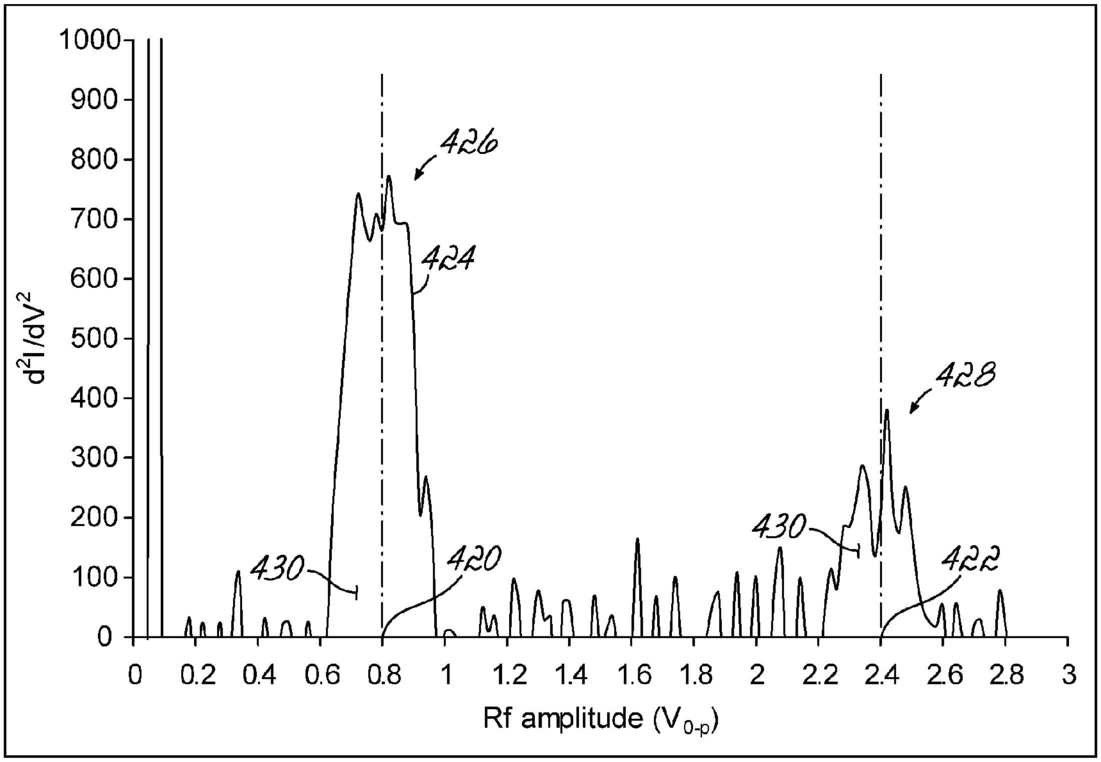
FIG. 4C is a graph of the Second Derivative of the Ion Current with respect to RF potential: $d^2I/dV^2$ versus V.

In another embodiment, the method of calibration may further include taking a Second Derivative of the Ion Current with respect to RF potential, which yields maxima 426, 428 in the $d^2I/dV^2$ curve (see FIG. 4C). These maxima 426, 428 correspond to the inflections 416, 418 in the Ion Current versus RF potential plot for the first and second ions, respectively. This utilization of the second derivative enables the further isolation of inflections 418, 420 from system noise, such as mechanically- and instrumentally-induced fluctuations in the linear relation. Further the maxima 426, 428 can be used to define the quantity of ions comprising the ion current 22*b* at the ion detector 14.

After the completion of the calibration, a spectrum of an unknown chemical can then be generated. The unknown chemical sample is prepared in a manner consistent with the calibration chemical sample. The unknown chemical sample containing at least one unknown chemical species is then injected into the ion source 12 and ionized within the ionization chamber 20 to at least first and second ions characterized by m1/z1 and m2/z2, respectively. Again, an ion current 22*a* is directed toward the ion separator 18. The electrical current generator 38 directs an electrical current through the first set of wires 34 thereby generating an RF potential. As the RF potential is varied, the ion current 22*b* is measured at the ion detector 14.

Figure 4D:
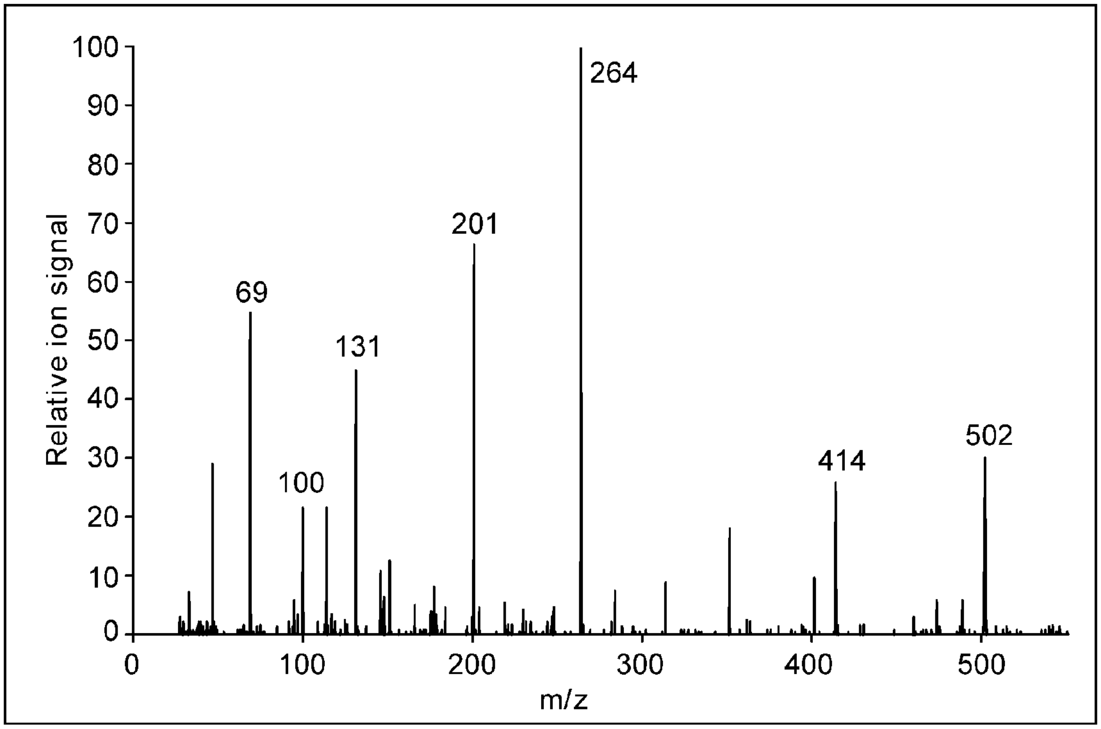
FIG. 4D is a graph of Relative Ion Intensity versus m/z, otherwise known as a spectrum.

The measured total ion current 406 will undergo inflections 416, 418 for each unknown ion when A=d/2 for the respective ion and in a manner as described previously. A second derivative, $d^2I/dV^2$ (see FIG. 2C) can be used for better analysis of the inflections 418, 420. By integrating the area 403 under each respective maxima 426, 428 on the second derivative curve, a relative ion intensity 430 (i.e. a standardized quantity of ions as illustrated in FIG. 4D) for each m/z value impacting the ion detector 14 is calculated.

The RF potentials 420, 422 satisfying the LMCO of each unknown ion species are compared to the known values in the calibration. In this way, the unknown m/z values for the unknown ions can be extrapolated. Because of the limited number of atoms, the limited number of possible charges associated with those atoms, and the natural abundances of respective atoms, the identity of an unknown ion can be determined within a degree of certainty. The now known m/z values can be correlated with the relative ion intensity to generate a spectrum.

Figure 5:
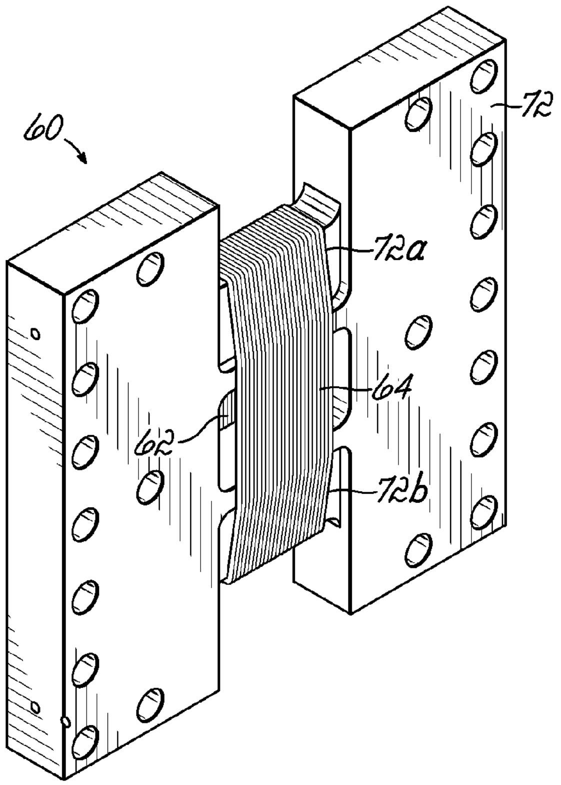
FIG. 5 is an isometric view of a double array according to another embodiment of the present invention.

While the apparatus and the method of using the apparatus have been provided in some detail above, various other embodiments of the present invention are envisioned and will now be explained. For example, improvements in the resolution of the spectra can be accomplished by increasing the resolving power of the ion separator 18 by creating a dual-array of wires 60 as illustrated in FIG. 5. Accordingly, first and second arrays 62, 64 are created such that the second array 64 is positioned substantially between the first array 62 and the ion detector 14 and such that the z-axis associated with the second array 64 is in a direction substantially similar to the z-axis of the first array 62.

In operation, the dual-array of wires 60 provides first and second filters for the ion current 22. The first and second arrays of wires 62, 64 may operate under the same selective ion monitoring mode (SIM), i.e. both arrays have the same LMCO and thus filter out the same m/z ion; alternatively, the first and second arrays of wires 62, 64 can operate separately, i.e. the first array of wires 62 having a first SIM while the second array 64 modulates to provide a modulated ion current curve (not shown).

Manufacture of a dual-array of wires 60 can include the formation of two arrays of wires 62, 64 placed at a specified distance apart as illustrated in FIG. 5. Otherwise, the dual-array of wires 60 can be formed by winding a wire having a diameter, D, about a support structure 72 having two substantially parallel planes 72*a*, 72*b* to support the winding. The support structure 72 can be constructed from a non-conductive polymer, such as polyimide, being approximately 1 inch (2.54 cm) in thickness. An exemplary support structure 72 is approximately 2 inches (5.08 cm) in length by approximately 2 inches (5.08 cm) in width.

As would be known by one skilled in art, it would be possible for the ion to undergo a mass change while within a space between the dual-array of wires 60. Mass change can occur by fragmentation or ion-molecule reaction, as described in Sleno, L.; Volmer, D. "Ion activation methods for tandem mass spectrometry." *J. Mass Spectrom.* 2004, 39, 1091-1112.

Figure 6:
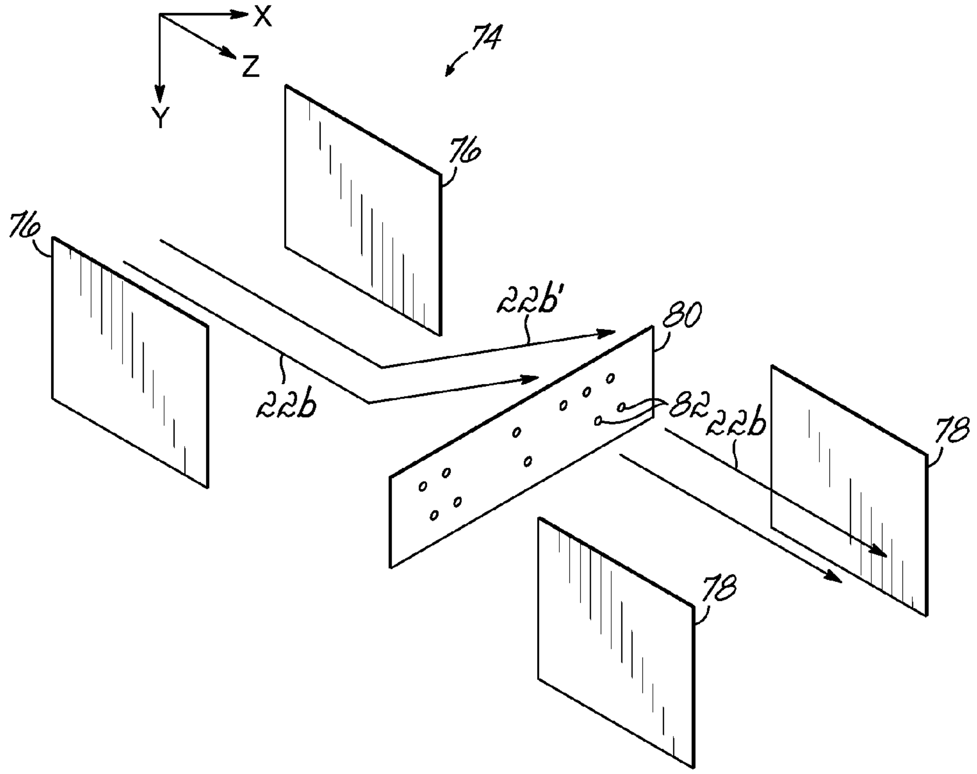
FIG. 6 is a schematic isometric view of a chevron low-pass filter according to another embodiment of the present invention.
Figure 7:
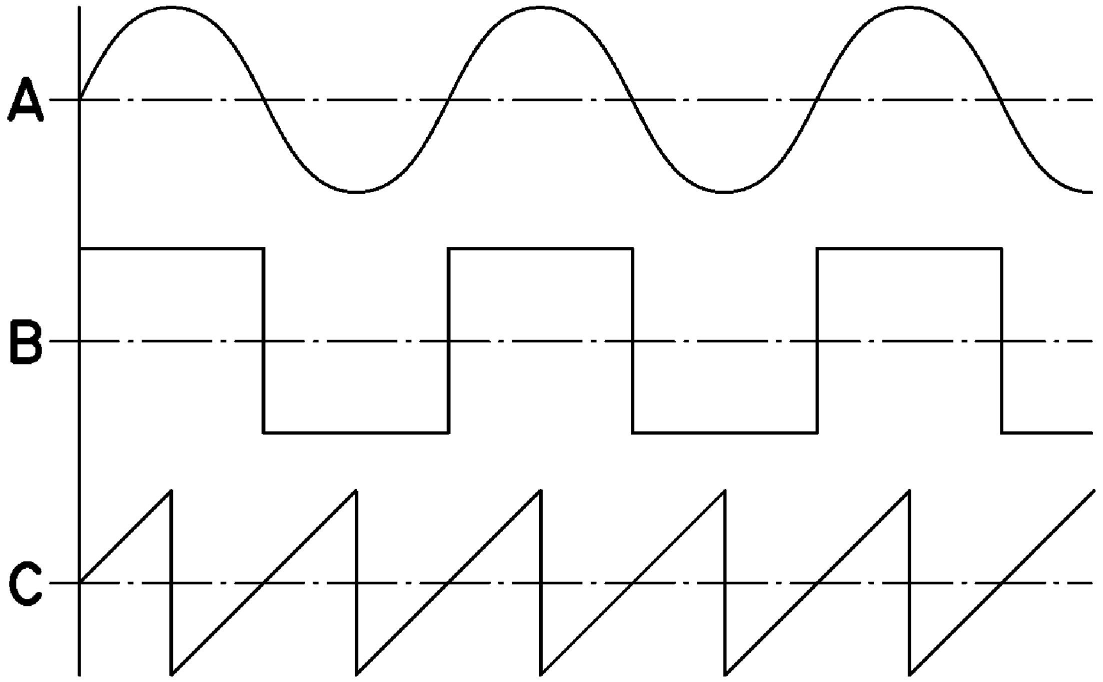
FIG. 7 illustrates various RF waveforms that can be utilized with the present invention.

The resolution can further be improved by incorporating a low-pass filter 74 as shown in FIG. 6. The low-pass filter 74 can be positioned between any ion separator 18 described previously and the ion detector 14 and includes first and second pairs of steering electrodes 76, 78 separated by a chevron electrode 80. The first and second pair of steering electrodes 76, 78 can be plates extending substantially within the y-z plane, i.e. aligned substantially parallel to the direction of the ion current 22. Each electrode of the first and second pairs of steering electrodes 76, 78 are separated by a distance of approximately 1 cm, or in other embodiments by distances of approximately 100 μm to approximately 500 μm. The chevron electrode 80 can be a plate having a plurality of holes 82, positioned between the first and second pairs of steering electrodes 76, 78, and extends substantially in the x-y plane. The plurality of holes 82 are manufactured at an angle, θ, with respect to the z-axis and where θ is preferred to be 45°; however, the angle may vary according to the degree of deflection created by the steering electrodes 76, 78. The chevron plate can be positioned between the first and second pairs of steering electrodes 76, 78 and separated from each by a distance of from approximately 500 μm to approximately 1 cm.

In operation, the ion current 22*b* traversing the ion separator 18 enters the low-pass filter 74 wherein only ions having a low m/z ratio are permitted to pass. A pulsed DC square-wave is applied to the first pair of steering electrodes 76 such that upon termination of the DC pulse, the direction of ion current 22*b* is deflected from a direction having primarily a z-axis component and results in ion current 22*b*' having both x- and z-axis components. Ions having a large m/z ratio will be deflected in the x-direction to a lesser degree than those having a smaller m/z ratio. Ions having a degree of deflection substantially similar to θ will traverse the chevron-plate 80 and continue toward the ion detector 14. After the ion current 22*b*' has traversed the chevron electrode 80, a second DC pulse is applied to the second pair of steering electrodes 78, which restores ion current 22*b* to substantially the z-axis. Ion detection may then be performed as described above.

Another embodiment relates to a method for obtaining a spectrum using the mass spectrometer 10 of the present invention in a frequency-scanning mode. As shown above in Equation 3, at a given RF potential field, E, m/z will vary with the inverse square of RF waveform frequency, ω. Thus, while maintaining a constant RF potential, the ω is varied to filter the ion current 22 for a first ion having an m/z; further variation of the ω will filter the ion current 22 for a second ion. Thus, analysis of the ion current 22*b* at the ion detector 14 can also be accomplished in a manner similar to the method described above for the amplitude-scanning mode.

Yet another embodiment relates to a method of using the mass spectrometer 10 of the present invention as a pre-filter to a second mass spectrometer, such as a linear quadrupole, a 2D-ion trap, a 3D-ion trap, an orbitrap, a time-of-flight analyzer, or an ICR analyzer. In this way, the ion current 22*b* passes from the ion separator 18, as described herein, to the second mass spectrometer rather than impacting the ion detector 14. In this way, the mass spectrometer 10 of the present invention will create a first filter for ion current 22 before the ion current 22*b* enters a higher resolution, non-portable second mass spectrometer.

As provided herein, the mass spectrometer 10 having a Loeb-Eiber filter as the ion separator 10 can operate at near atmospheric pressures and with low electrical power demand. Thus, the mass spectrometer can be constructed in a manner that is mobile, i.e. portable, and yet retains the ability to generate high-resolution spectra having a low signal-to-noise ratio.

This has been a description of the present invention along with the various methods of practicing the present invention. However, the invention itself should only be defined by the appended claims.

The invention claimed is:

1. A mass spectrometer comprising:

an ion source;

an ion detector;

an ion separator positioned between the ion source and the ion detector and comprising first and second Loeb-Eiber filters; wherein each of the first and second Loeb-Eiber filters include: an array of wires, the array having first and second sets of wires, wherein a distance between adjacent wires is less than a diameter of each of the wires; and an electrical current generator configured to create an electrical current and supply the electrical current to at least the first set of wires.

2. The mass spectrometer of claim 1 wherein each of the wires is made of a material selected from the group consisting of nitinol (NiTi), gold (Au), or copper (Cu), or combinations thereof.

3. The mass spectrometer of claim 1, wherein each of the wires has a cross-sectional area that is substantially circular, square, or rectangular.

4. The mass spectrometer of claim 1 wherein the diameter of each of the wires ranges from approximately 1 μm to approximately 10 cm and the distance between adjacent wires ranges from approximately 1 μm to approximately 10 cm.

5. The mass spectrometer of claim 4 wherein the diameter of each of the wires is greater than approximately five times the distance between adjacent wires and less than approximately two times the distance between adjacent wires.

6. The mass spectrometer of claim 1 wherein the electrical current is an alternating current having a waveform applied to the first set of wires or the second set of wires or a combination thereof.

7. The mass spectrometer of claim 1 wherein the first and second arrays of wires are operable at substantially the same oscillation amplitude or substantially the same oscillation frequency or a combination thereof.

8. The mass spectrometer of claim 1 wherein the electrical current supplied to the first array is maintained while the electrical current supplied to the second array is variable.

9. The mass spectrometer of claim 1 wherein a mass change reaction occurs between the first and second Loeb-Eiber filters.

10. A mass spectrometer comprising:

an ion source;

an ion detector;

a first ion separator positioned between the ion source and the ion detector and comprising a Loeb-Eiber filter; wherein the Loeb-Eiber filter includes: an array of wires, the array having first and second sets of wires, wherein a distance between adjacent wires is less than a diameter of each of the wires; and an electrical current generator configured to create an electrical current and supply the electrical current to at least the first set of wires; and a second ion separator positioned between the ion source and the first ion separator, wherein the second ion separator including a low-pass filter comprising first and second pairs of steering electrodes separated by a chevron electrode, wherein the chevron electrode includes a plurality of holes formed at an angle θ.

11. The mass spectrometer of claim 10 wherein θ is 45°.

12. The mass spectrometer of claim 10 wherein the electrodes of the first and second pairs of steering electrodes are separated by approximately 100 μm to approximately 500 μm.

13. The mass spectrometer of claim 10 wherein the chevron electrode is separated from the first and second pairs of steering electrodes by approximately 500 μm to approximately 1 cm.

14. A mass spectrometer comprising:

an ion source;

an ion detector;

a first ion separator positioned between the ion source and the ion detector; and a second ion separator positioned between the ion source and the first ion separator, wherein the second ion separator comprising a Loeb-Eiber filter; wherein the Loeb-Eiber filter includes: an array of wires, the array having first and second sets of wires, wherein a distance between adjacent wires is less than a diameter of each of the wires; and an electrical current generator configured to create an electrical current and supply the electrical current to at least the first set of wires.

15. The mass spectrometer of claim 14 wherein the first ion separator is selected from the group consisting of a linear quadrupole, a 2-D ion trap, a 3-D ion trap, an orbitrap, a time-of-flight mass analyzer, and an ICR mass spectrometer.

16. A mass spectrometer comprising:

an atmospheric ion source;

an ion detector; and an ion separator positioned between the ion source and the ion detector and comprising a Loeb-Eiber filter; wherein the Loeb-Eiber filter includes: an array of wires, the array having first and second sets of wires, wherein a distance between adjacent wires is less than a diameter of each of the wires; and an electrical current generator configured to create an electrical current and supply the electrical current to at least the first set of wires.

17. The mass spectrometer of claim 16 wherein the atmospheric ionization ion source is selected from the group consisting of a desorption electrospray ionization (DESI) source, a direct analysis in real time (DART) source, an atmospheric pressure photoionization (APPI) source, and an atmospheric pressure chemical ionization (APCI) source.

18. A method of performing a chemical analysis with a mass spectrometer, the mass spectrometer comprising an ion source; an ion detector; an ion separator positioned between the ion source and the ion detector and comprising an array of wires, the array having first and second sets of wires, wherein a distance between adjacent wires is less than a diameter of each of the wires; and an electrical current generator configured to create an electrical current and supply the electrical current to the first set of wires while the second set of wires remains grounded, the method comprising:

generating an ion current in a direction generally from the ion source to the ion detector, the ion current further comprising first and second ions, wherein the first and second ions differ in a mass-to-charge ratio;

directing the electrical current through the array of wires thereby generating an RF field;

exposing the ion current to the RF field;

varying an RF voltage of the RF field;

detecting a first ion current for the first ion by the ion detector;

identifying an inflection point in the first ion current by taking a first or second derivative of the ion current with respect to the RF voltage; and relating the RF voltage associated with the inflection point to the mass-to-charge ratio of the first ion.

19. The method of performing a chemical analysis of claim 18 wherein the relating further includes comparing the RF voltage to a calibration quantity, wherein the calibration quantity was determined by a calibration.

20. The method of performing a chemical analysis of claim 18 further comprising:

detecting a second ion current for a second ion;

identifying the inflection point in the second ion current by taking a first or second derivative of the ion current with respect to the RF voltage; and relating the RF voltage associated with the inflection point to the mass-charge ratio of the second ion.

21. The method of claim 18 wherein an area defined by the first or second derivative at the inflection point defines a quantity from the detecting.

22. A method of separating ions comprising:

generating an ion current in a direction generally from a source to an ion detector, the ion current further comprising first and second ions;

directing an electrical current through an array of wires thereby generating an RF, the array having first and second sets of wires, wherein a distance between adjacent wires is less than a diameter of each of the wires;

exposing the ion current to the RF; and maintaining the RF at a first voltage while varying a frequency of an RF waveform.

23. The method of claim 22 wherein the RF waveform is a sine wave, a square-wave, or a saw-tooth wave.

* * * * *